(12) United States Patent
Queveau et al.

(10) Patent No.: US 7,377,573 B2
(45) Date of Patent: May 27, 2008

(54) REAR DECK HOOD FOR FOLDING ROOF VEHICLE

(75) Inventors: Gerard Queveau, Le Pin (FR); Paul Queveau, Montravers (FR); Jean-Marc Guillez, Cirieres (FR)

(73) Assignee: Societe Europeenne de Brevets Automobiles (FR)

(*) Notice: Subject to any disclaimer, the term of this patent is extended or adjusted under 35 U.S.C. 154(b) by 3 days.

(21) Appl. No.: 10/517,249

(22) PCT Filed: Jun. 10, 2003

(86) PCT No.: PCT/FR03/01724

§ 371 (c)(1),
(2), (4) Date: Jul. 11, 2005

(87) PCT Pub. No.: WO03/104007

PCT Pub. Date: Dec. 18, 2003

(65) Prior Publication Data

US 2006/0163907 A1  Jul. 27, 2006

(30) Foreign Application Priority Data

Jun. 11, 2002  (FR) .................................. 02 07156

(51) Int. Cl.
*B60J 7/00* (2006.01)
(52) U.S. Cl. ................................................ 296/107.08
(58) Field of Classification Search ........... 296/107.08, 296/76, 108
See application file for complete search history.

(56) References Cited

U.S. PATENT DOCUMENTS

| 5,655,331 | A  | * | 8/1997  | Schrader et al. ............... 49/280 |
| 6,092,335 | A  | * | 7/2000  | Queveau et al. ....... 296/107.08 |
| 6,186,577 | B1 | * | 2/2001  | Guckel et al. ......... 296/107.08 |
| 6,250,707 | B1 | * | 6/2001  | Dintner et al. ......... 296/107.08 |
| 6,299,234 | B1 | * | 10/2001 | Seel et al. .................... 296/108 |
| 6,595,572 | B2 | * | 7/2003  | Schuler et al. ......... 296/107.08 |
| 6,705,662 | B2 | * | 3/2004  | Sande .................... 296/107.08 |
| 6,715,819 | B2 | * | 4/2004  | Weissmueller ......... 296/107.08 |
| 6,786,525 | B2 | * | 9/2004  | Russke et al. ......... 296/107.08 |
| 6,811,206 | B2 | * | 11/2004 | Wagner ....................... 296/76 |
| 6,824,194 | B2 | * | 11/2004 | Weissmueller et al.  296/107.08 |
| 6,866,327 | B2 | * | 3/2005  | Willard .................. 296/107.08 |
| 6,899,368 | B2 | * | 5/2005  | Neubrand ............. 296/107.08 |
| 6,916,058 | B2 | * | 7/2005  | Krajenke ....................... 296/76 |
| 7,004,529 | B2 | * | 2/2006  | Guillez et al. ......... 296/107.08 |
| 2003/0218354 | A1 | * | 11/2003 | Plesternings ........... 296/107.08 |
| 2005/0285428 | A1 | * | 12/2005 | Dulluvio ................ 296/107.08 |
| 2006/0186694 | A1 | * | 8/2006  | Wagner ................. 296/107.08 |

* cited by examiner

*Primary Examiner*—Kiran B. Patel
(74) *Attorney, Agent, or Firm*—Bachman & LaPointe, P.C.

(57) ABSTRACT

The lid for a rear trunk of a vehicle having a roof foldable into the trunk is connected to the bodywork by device disposed at the front edge and at the rear edge of the lid and whose function is either to lock or to hinge the lid in a manner such that said lid can open either from the front backwards or from the rear forwards, and control device cause the lid to open in either of its opening directions or to be closed. According to the invention, the control device comprise at least one articulated arm and an actuator which is connected to the articulated arm and to the bodywork, and which is adapted to move the articulated arm and the lid.

13 Claims, 6 Drawing Sheets

REAR DECK HOOD FOR FOLDING ROOF VEHICLE

BACKGROUND OF THE INVENTION

The present invention relates to a lid assembly for a rear trunk of a vehicle having a roof that is foldable (retractable) into the trunk. The present invention also relates to the vehicle itself.

A lid assembly for a rear trunk of a vehicle having a roof that is foldable into the trunk is known that is of the type comprising firstly a lid which is connected to the bodywork of the vehicle in the vicinity of its front edge via front locking and hinge members (combined or separate), and in the vicinity of its rear edge via rear locking and hinge members, and which is movable between a closed position and a first open position by pivoting from the front backwards for the purpose of allowing the folded roof to pass through and to be stowed, or between said closed position and a second open position by pivoting from the rear forwards for the purpose of stowing luggage, and secondly control means adapted to open the lid in both opening directions and to close it, the locking members being arranged to be locked at the front and unlocked at the rear for opening the lid by pivoting it forwards, and vice versa for opening the lid backwards.

When locking and hinging are "combined", such a lid assembly is described in French Patent Application FR 2 777 241. In that patent application, the control means are constituted by a pair of actuators each having its cylinder connected pivotally to the bodywork and its rod, which is movable between a deployed position and a retracted position in which it is retracted into the cylinder, is connected pivotally to the lid.

However, for reasons of geometry, the prior art control means cannot always be adapted to any type of vehicle, especially for vehicles whose trunks are small in volume.

SUMMARY OF THE INVENTION

An object of the present invention is thus to broaden the range of motor vehicles that can be equipped with lids opening from the front backwards and from the rear forwards by reducing the cost of the assemblies for performing such opening, and by providing a solution that is relative simple mechanically.

According to the invention, the control means of the lid of the above-mentioned type comprise:

at least one articulated arm which is movable firstly between a retracted position in which the lid is in its closed position and a first deployed position in which the lid is in its open position in which it is opened from the front backwards, and secondly between said retracted position and a second deployed position in which the lid is in its open position in which it is opened from the rear forwards; and an actuator which is connected to the articulated arm and to the bodywork, and which is adapted to actuate the articulated arm.

In association with the above, it is also recommended for synchronization means to be used that are adapted to co-ordinate the locked or the unlocked configuration of the locking means with the lid starting to move between its closed position and its open positions under the control of the articulated arm, by unlocking the corresponding locking means in a manner co-ordinated with the deployment of the articulated arm, both when the lid is being opened forwards and when it is being opened backwards.

Such use of the articulated arms optimizes their operation and limits the number of parts to be provided for driving the lid in the two opening directions.

In relation to the above-mentioned objects, a corollary requirement concerns:

the way in which the control means act to prevent the articulated arm from coming into abutment against the trunk gutter and from being too bulky; and adapting the control means to various rear trunk shapes and to various surrounding bodywork shapes.

Therefore, an additional aspect of the invention recommends that:

the articulated arm be disposed in the vicinity of a side wall of the trunk and comprise firstly a top rod connected via its top end to the lid where the articulated arm is mounted to pivot about a top axis that is transverse to the vehicle, and secondly a bottom rod connected, in the vicinity of its bottom end, to the bodywork in a manner such as to pivot about a bottom axis that is transverse to the vehicle, and, in the vicinity of its top end, to the bottom end of the top rod in a manner such as to pivot about an intermediate hinge axis that is transverse to the vehicle;

said intermediate axis being situated further forwards than the straight line that interconnects the bottom and the top hinge axes, when the lid is open backwards;

the top axis being situated between the front edge and the rear edge of the lid, preferably further forwards than the bottom axis when the lid is in the closed position; and/or at said intermediate axis, the articulated arm defines an angle pointing forwards when the lid is in its closed position and when it is in either of its open positions.

In the first and third cases, the above-mentioned problem of coming into abutment is, in particular, solved for vehicles whose lateral tapering is not very pronounced remote from the rear of the vehicle.

In the second case, the opening/closure movements of the lid are controlled effectively, regardless of whether the opening movement takes place forwards or backwards, the risk of interference with the trunk gutter being particularly small since said "top axis" is situated in the longitudinal front half of the lid.

Another problem taken into account concerns the hinging of the above-mentioned lid when the top front zone of the trunk is occupied, in the longitudinal direction of the vehicle, over a depth that is large enough (or even transversely over a width that is also large enough) for there to be a risk of a back shelf of large size, for example, or of a device for protecting the front hinge zone from the roof interfering with the opening/closure movement of the drive arms that drive the lid, when said shelf is in a position such as a horizontal position or while it is being tilted in order to enable the roof to be stowed or to be deployed.

In which case (the rear tapering of the trunk permitting), it is recommended, unlike what is stated above, for said intermediate axis of each arm (of the above-mentioned type) to be situated further backwards than the straight line that interconnects the bottom and the top hinge axes, when the lid is open forwards, the top axis then being situated between the front edge and the rear edge of the lid, preferably further backwards than the bottom axis when the lid is in the closed position.

Thus, the zone in which the arms are deployed is shifted further towards the rear of the trunk away from the zone occupied by the back shelf (or by another "interfering" element situated in the same zone).

In order to optimize the effectiveness of action of the articulated arms, in both opening directions, while increasing compactness, it is also recommended for the top rod of each arm to be connected directly to the lid in the vicinity of its top end.

Such control means offer the advantage of being compact, which makes it possible firstly to save space in the trunk, and secondly to enable them to be adapted to a larger number of vehicle models.

Other features and advantages of the present invention appear from the following description.

BRIEF DESCRIPTION OF THE DRAWINGS

In the accompanying drawings, given as non-limiting examples.

DETAILED DESCRIPTION OF THE PREFERRED EMBODIMENT(S)

Figure 1:
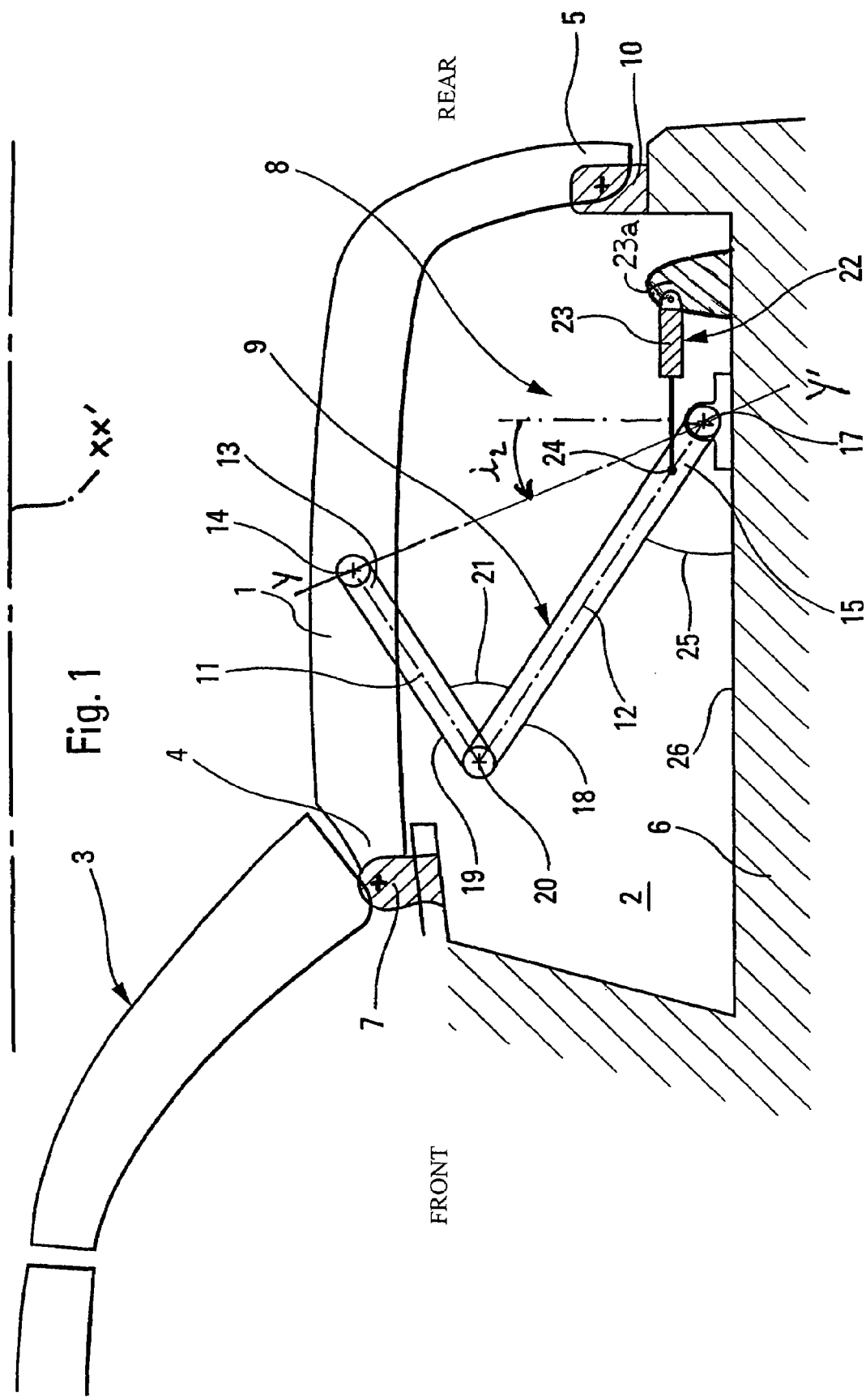
FIG. 1 is a diagrammatic view in longitudinal section of a vehicle trunk equipped with a lid of the present invention, with said lid being shown in the closed position.

FIG. 1 shows a lid 1 for a rear trunk 2 of a vehicle which also has a rigid roof 3 that is retractable into the trunk 2.

The lid 1 has a front edge 4 and a rear edge 5, and it is connected in hinged manner to the bodywork 6 of the vehicle at its front edge 4 (pivot axis 7a transverse to XX') by front members 7 and at its rear edge 5 by rear members 10 (rear transverse pivot axis 10a), the front members 7 and the rear members 10 either locking the lid in hinged manner, or unlocking the lid 1 so that it can open either from the front backwards to allow the folded roof 3 to pass through and to be stowed, or from the rear forwards to give access to the trunk 2 from the rear for stowing luggage therein. Such members 7, 10 are well known to the person skilled in the art and, for example, can be similar to the latches described in Patent Application FR 2 777 241.

The lid 1 is also connected to the bodywork 6 via control means 8 that are adapted to cause the lid 1 to open and to close, in one direction or the other.

Said control means are dissociated from the locking means and from the hinge means, both at the front and at the rear of the lid.

In the example shown in FIGS. 1 to 4, the control means 8 comprise a pair of articulated arms 9 disposed in the lid 2, symmetrically about the longitudinal axis XX' of the vehicle, in the immediate vicinity of the side walls 30 of the trunk, so as not to obstruct the volume of the trunk.

Each articulated arm 9 comprises a top rod 11 and a bottom rod 12.

The top rod 11 is connected via its top end 13 to the lid 1 so as to pivot about a top axis 14 transverse to the vehicle (transverse to the axis XX' thereof).

The bottom rod 12 is connected via its bottom end 15 to the bodywork 6 so as to pivot about a bottom axis 17 transverse to the vehicle (transverse to the axis XX' thereof). The bottom rod 12 is connected via its top end 18 to the bottom end 19 of the top rod 11 so as to pivot about a hinge axis 20 transverse to the vehicle (transverse to the axis XX' thereof).

For operating effectiveness in difficult situations, it is recommended for the axis 14 to be longitudinally further forwards than the axis 17 when the lid is closed.

Therefore, when the lid is closed, as can be seen in FIG. 1, the top rod 11 and the bottom rod 12 form a salient angle 21, and the rod 12 forms an acute angle 25 with the bottom 26 of the trunk 2.

For each articulated arm 9, the control means 8 further comprise an actuator 22. The actuator 22 is connected to the articulated arm 9 and to the bodywork 6 (via the stationary part 23a), and it is adapted to move the articulated arm 9 and the lid 1.

Figure 2:
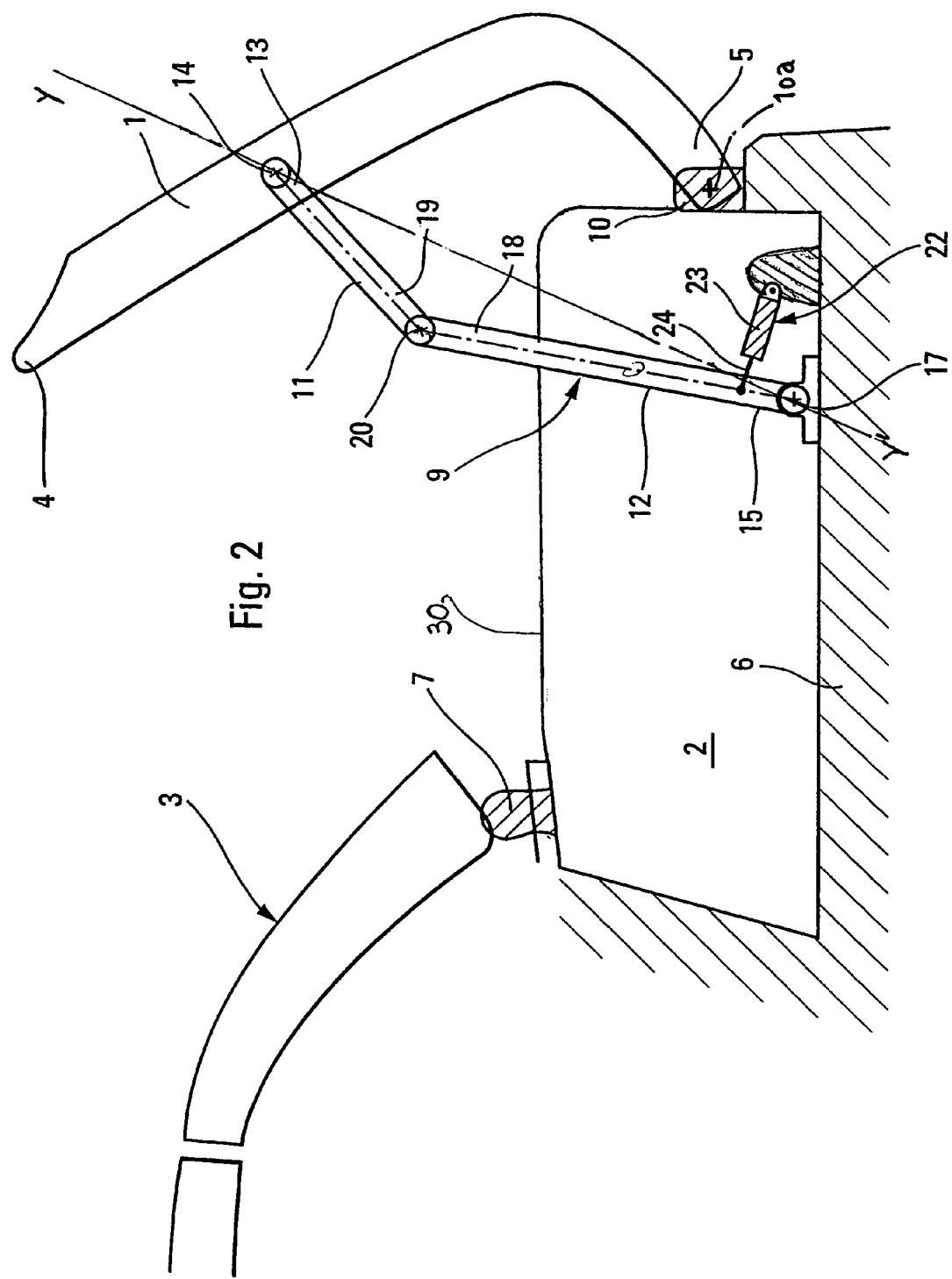
FIG. 2 is a view similar to the FIG. 1 view, with the lid being in the opened-backwards position adapted to allow the folded roof to pass through and to be stowed.
Figure 3:
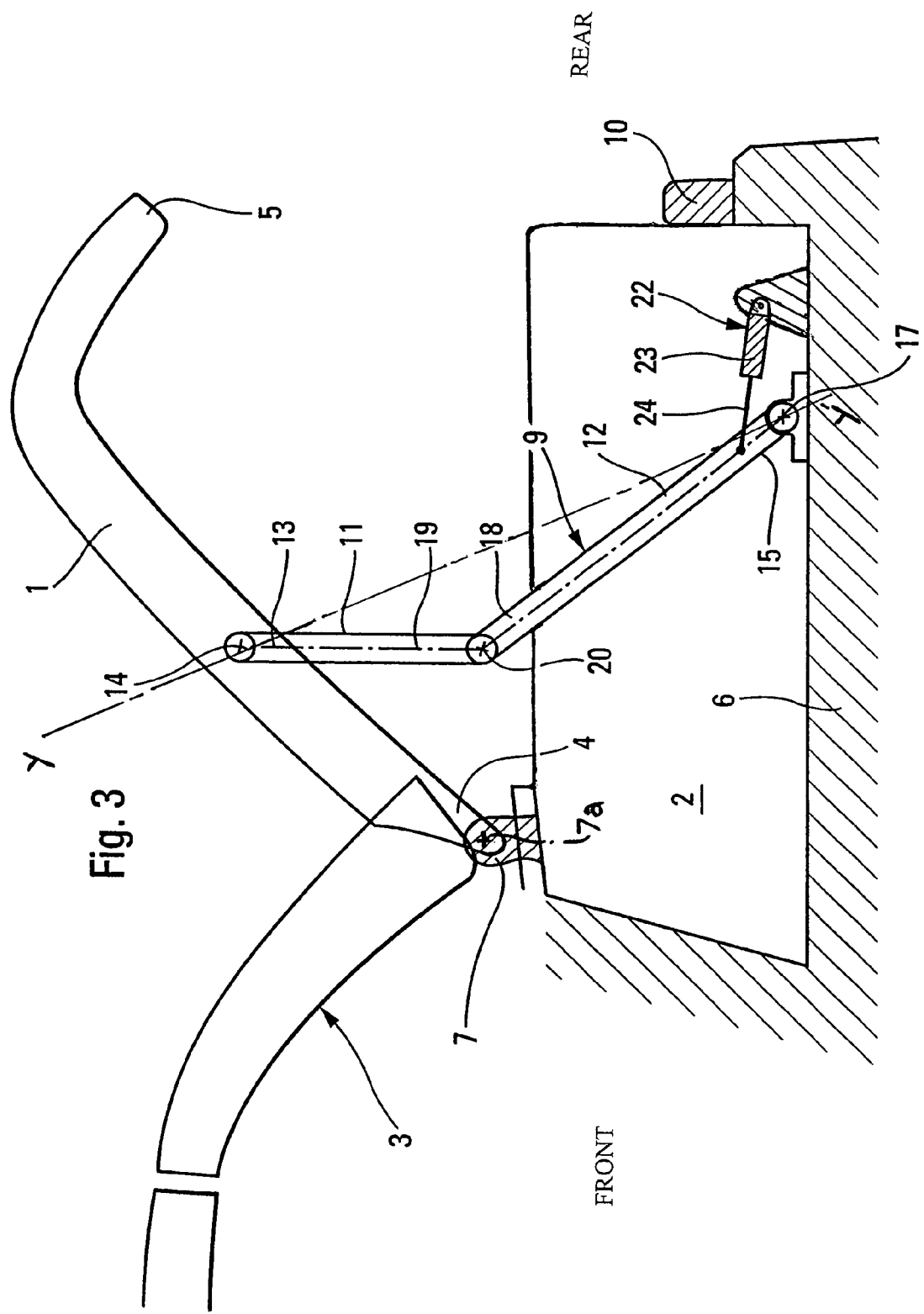
FIG. 3 is a view similar to the FIG. 1 view, with the lid being in its opened-forwards position adapted to allow luggage to be stowed.

In the example shown in FIGS. 1 to 3, the actuator is an actuator 22 whose cylinder 23 is connected pivotally to the bodywork 6 and whose rod 24, which is mounted to move relative to the cylinder 23 between a deployed position and a retracted position, is connected pivotally to the articulated arm 9, and more precisely to the bottom rod 12.

In order to make it possible to open the lid 1 in one direction or the other, the actuator 22 is arranged relative to the articulated arm 9 in a manner such that the salient angle 21 and the acute angle 25 increase when the lid 1 goes from its closed position to one or the other of its open positions.

In the present example, in order to enable the lid 1 to be opened in one direction or the other, when the lid 1 is in the closed position, the hinge axis 20 is directed towards the front of the vehicle (FRONT in FIG. 1), the actuator 22 is situated between the articulated arm 9 and the rear edge 5 of the lid 1, and the rod 24 of the actuator 22 is in the deployed position. As a result, when the control means 8 cause the lid 1 to go into one of its open positions, the rod 24 of the actuator 22 retracts into the cylinder 23 and pulls the bottom rod 12 of the articulated arm 9 including the hinge axis 20 towards the rear of the vehicle (REAR). Thus, the salient angle 21 increases and the lid 1 opens.

In order to open the lid 1 from the front backwards, when the user activates the relevant control, the front latches 7 are unlocked, and then the rod 24 of the actuator 22 retracts into the cylinder 23, thereby causing the lid 1 to open from the front backwards. In order to open the lid 1 from the rear forwards, when the user activates the relevant control, the rear latches 10 are unlocked, and then the rod 24 of the actuator 22 retracts into the cylinder 23, thereby causing the lid 1 to open from the rear forwards.

Figure 6:
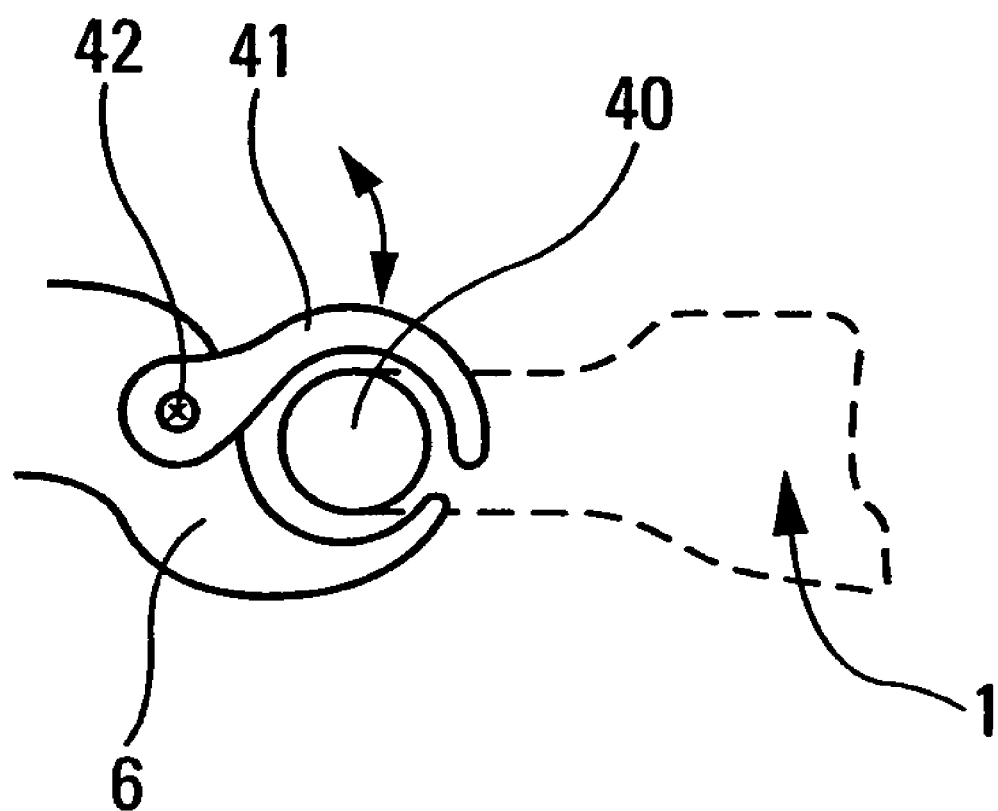
FIG. 6 is a diagrammatic section view of a locking and hinge member for locking and hinging the lid to the bodywork of the vehicle.

As can be seen in FIG. 6, each front latch 7 and each rear latch 10 comprises, firstly a first coupling member formed by a bar 40 which is carried by the lid 1, and secondly a second coupling member formed by a hook 41 which is carried by the bodywork and which is mounted to move relative thereto about a pivot axis 42 between an unlocking position in which, when the lid 1 is in the closed position, the hook is disposed relative to the bar 40 in a manner such as to enable said bar to be released during opening of the lid, and a locking position in which, when the lid 1 is in the closed position, the bar 40 is received in the recess of the hook 41 that matches the cylindrical shape of the bar 40 which forms a pivot pin about which the lid is adapted to pivot.

In addition, the vehicle includes synchronization means 43 which are adapted to co-ordinate the configuration of the locking and hinge members 7, 10 with the lid starting to move between its closed position and its open positions: when the user actuates opening of the lid 1 from the front backwards, the synchronization means 43, prior to any opening movement of the lid 1, drive the hooks 41 of the front latches 7 into their unlocking position, and maintain the hooks 41 of the rear latches 10 in their locking position. When the user actuates opening of the lid 1 from the rear forwards, the synchronization means 43, prior to any opening movement of the lid 1, drive the hooks 41 of the rear latches 10 into their unlocking position and maintain the hooks 41 of the front latches 7 in their locking position. In both cases, the action on the latches is co-ordinated with deployment of the arms 9.

Figure 4:
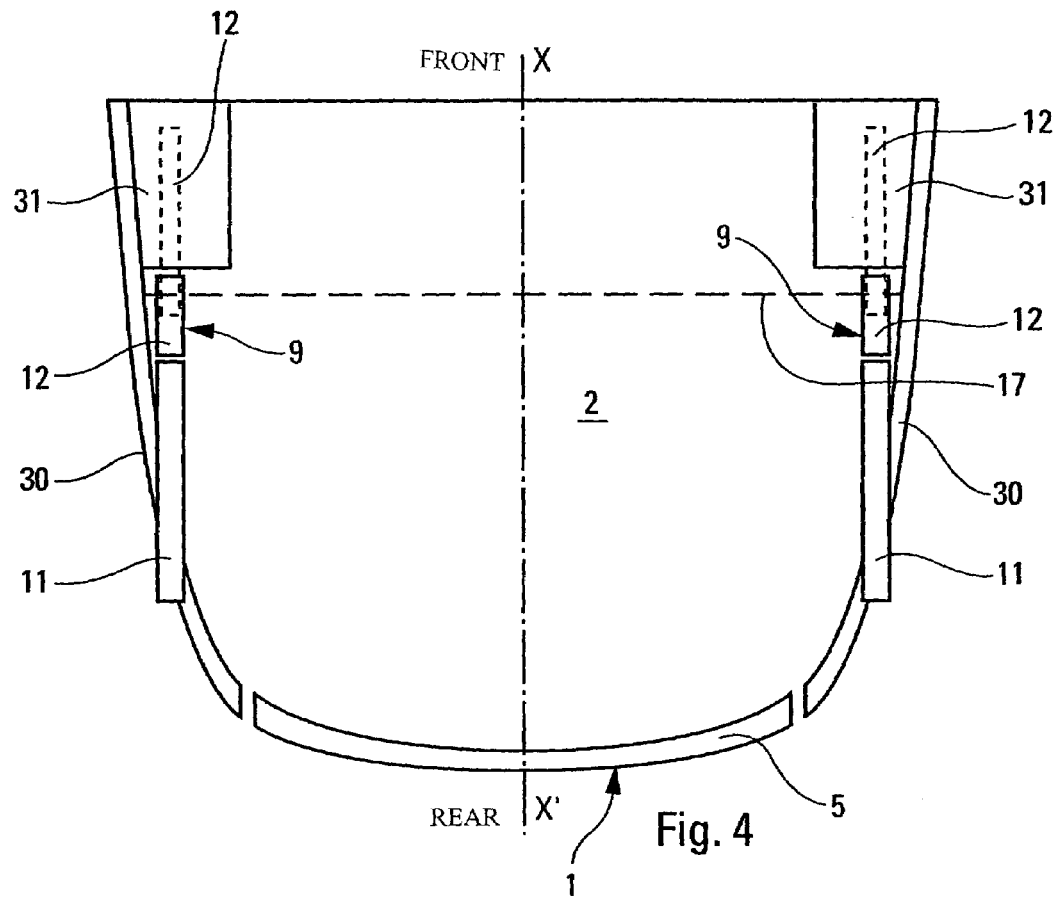
FIG. 4 is a plan view of a rear trunk, without the lid.

In general, as can be seen in FIG. 4, the side walls 30 of the bodywork defining the rear trunk 2 converge going towards the rear, so that the rear trunk 2 is wider at its front than at its rear.

In order to obtain maximum opening of the lid 1 in both opening directions, it is preferable for the coupling between the top rod 11 and the lid 1 to be situated substantially in the middle of the lid 1, in the longitudinal direction XX' of the vehicle.

The control means used in the prior art are constituted by actuators that are hinged directly to the bodywork and to the lid, and that must have a large amplitude of movement in order impart a large amplitude of movement to the lid.

In the embodiment shown in FIGS. 1 and 3, the control means 8 are shaped so as to have a small amplitude of movement for the portions situated in the rear trunk 2, while also enabling the lid 1 to have a large amplitude of movement for opening it in both directions.

As can be seen in FIGS. 2 and 3, each articulated arm 9 is shaped such that, when the lid 1 is open from the front backwards or from the rear forwards, the top end 18 of the bottom rod 12 (the longer rod) projects from the rear trunk 2 in the vertical direction, i.e. it is situated above the (typically horizontal) opening plane 32 of the rear trunk 2 that is defined by the top ends of the side walls 30 (or gutter) of said trunk. Thus, when the lid 1 is open, regardless of whether it is open from the front backwards or from the rear forwards, the entire top rod 11 is situated above the opening plane 32. As a result, preferably most of or even all of the top rod 11 can, when the lid is open 1 in either direction, extend outside the rear trunk 2 in the longitudinal and/or transverse directions, i.e. the projection of the top rod 11 in the opening plane can extend outside the perimeter defined by the top ends of the side walls 30 (FIG. 4). It is thus possible judiciously to compensate for the lateral tapering of the trunk, at the rear thereof.

As a result, it is possible, as can be seen in FIG. 4, to have a bottom rod 12 connected to the bodywork 6 via the floor of the rear trunk 2, in the immediate vicinity of the respective one of the side walls 30, in the widest portion of the rear trunk 2 even if said portion is very small since it is limited to the rear by the curvature of the side walls 30 and to the front by a wheel arch 31, the amplitude of movement of the bottom rod 12 being limited firstly by the wheel arch 31 (the bottom rod 12—shown in dashed lines in FIG. 4—being situated above a wheel arch 31 when the lid 1 is closed), and secondly by the curvature of the side walls 30 (the bottom rod 12—shown in continuous lines in FIG. 4—having its top end in the immediate vicinity of the side wall 30 and being in a substantially vertical position when the lid 1 is open).

In addition, since the bottom rod 12 has a small amplitude of movement, it is possible to use an actuator 22 of small size.

It should also be noted that both when the lid is in the closed position and also when it is in either of its open positions (FIGS. 2 and 3), the intermediate hinge point 20 is situated in front of the straight line YY' that interconnects the hinge points at which the articulated arm 9 is hinged respectively to the lid and to the bodywork.

Preferably, the hinge point via which the articulated arm is hinged to the lid 14 is situated further forwards than the hinge point via which it is hinged to the bodywork 17 when the trunk is closed (FIG. 1).

As regards the angle formed by the rods of the "dividers" 9 (i.e. of the two rods 11, 12 of the articulated arm 9) at the intermediate axis 20, it is recommended for said angle to be project towards the front of the vehicle (see FIGS. 1 and 3) when the lid is in all of its positions.

All this is conducive to adapting a lid 1 that can open from the front backwards and from the rear forwards to numerous rear trunks, even those that have small volumes or whose shapes are awkward (considerable narrowing of the width of the rear trunk towards the rear end of the vehicle): the intermediate hinge 20 passes between the walls 30 of the trunk, which it could not do if it were further to the rear, and the small amplitudes of movement of the actuator 22 and of the bottom rod 12 can, if necessary, be compensated by the movement outside the trunk 2 of the top rod 11 which is connected longitudinally in the vicinity of the middle of the lid 1, which makes it possible for said lid to have a large amplitude of movement in both opening directions.

Figure 5:
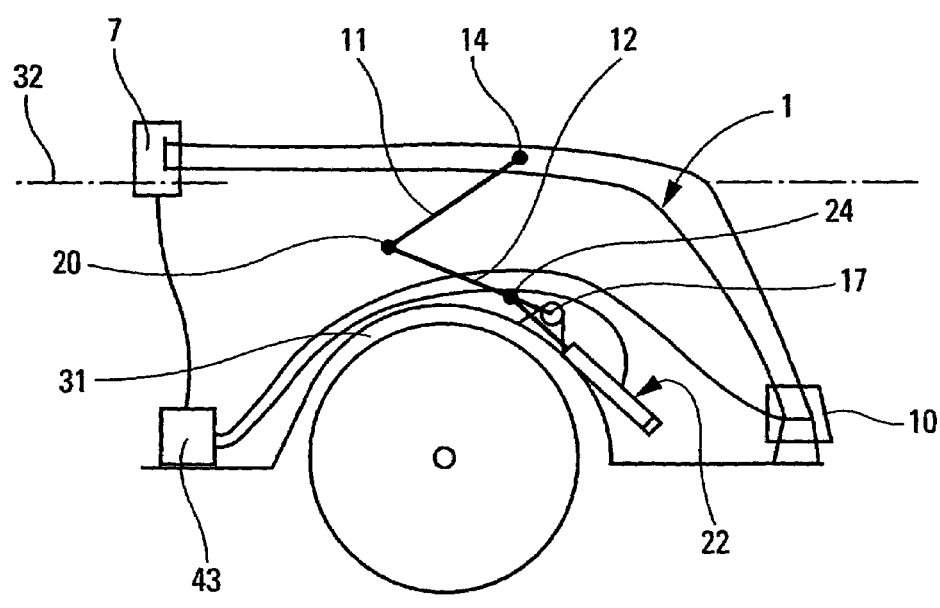
FIG. 5 is a diagrammatic view in longitudinal section of a vehicle trunk equipped with a lid in a second embodiment of the present invention.

In the embodiment shown in FIG. 5, because of the lack of available space in the rear trunk 2 of the vehicle, the bottom rod 12 is coupled to the bodywork 6 on that portion of the bodywork which defines the arch 31 for the wheel (the length of the bottom rod 12 is thus reduced) and the actuator 22 is disposed along the substantially vertical surface of the arch 31, under the bottom axis 17.

In the present embodiments, the control means 8 are disposed entirely inside the rear trunk 2 when the lid 1 is in the closed position.

By appropriately choosing the locations of the fixing points at which the actuator 22 and the rods 11, 12 of the "dividers" 9 are fixed to the bodywork and to the lid, it is possible advantageously to limit the stroke of the actuator and especially to use a single-stroke actuator whose rod extends over a single distance only regardless of the opening direction of the trunk. For this purpose, it is recommended for the top rod of the arm to be fixed in the front three-fourths of the lid (FIG. 5 or 7).

Figure 7:
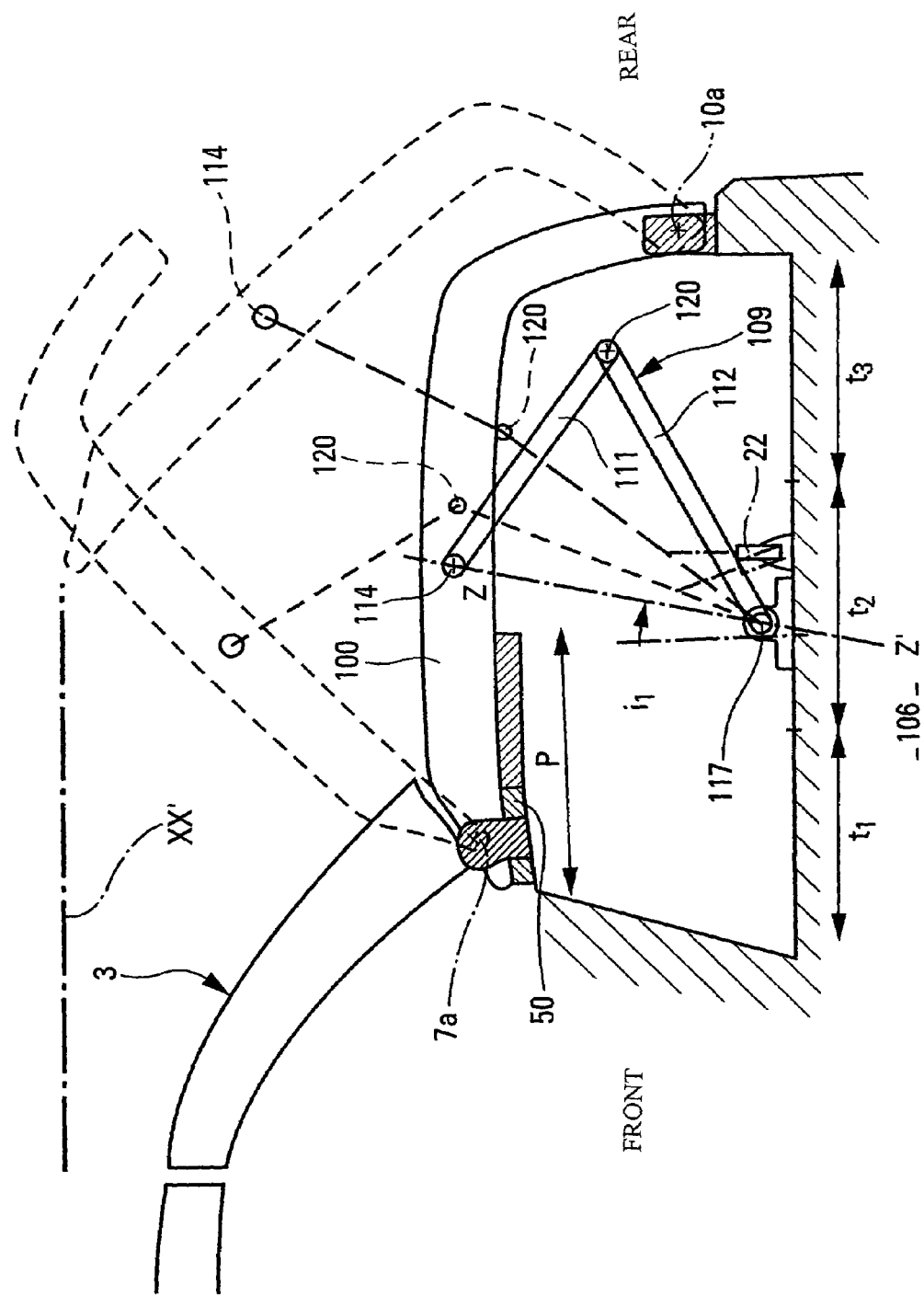
FIG. 7 is a view similar to FIG. 1, in another embodiment, the lid being shown in the closed position (continuous lines), in the opened-forwards position, and in the opened-backwards position, the movement of an arm also being shown.

FIG. 7 shows an example in which a back shelf 50 that is mounted to pivot about an axis transverse to XX' or to slide along XX' for the purpose of allowing the roof to pass through might interfere with the arms 109 during at least some of the opening/shutting movements of the lid.

In FIG. 7, the parts shown in the preceding figures are given like reference numerals plus one hundred.

In view of the depth P to which the shelf (which is horizontal in this example) encroaches into the top front portion (FRONT) of the trunk, the arm points towards the rear (REAR) at 120 along the axis XX' both in the retracted position (lid 100 closed) and in the deployed position (lid totally open forwards or backwards). The top hinge point 114 at which the arm is hinged to the lid is further to the rear (along XX') than the bottom hinge 117 at which the arm is hinged to the bodywork, when the lid is closed. When the lid is in all three of its above-mentioned positions, the intermediate hinge 120 is situated to the rear of the straight line ZZ' which intersects the axes 114 and 117. The top axis 114 is preferably substantially in the middle (intermediate third, $t_2$) of the lid, along XX', as in FIGS. 1 to 3; the bottom axis 117 is also in the middle (and it can even be brought forwards into the front third, $t_1$), whereas, when the problems of the trunk tapering towards the rear are solved (FIGS. 1 to 3), said bottom axis is advantageously in the rear third ($t_3$). Preferably, the angle "$i_1$" that the straight line ZZ' forms with the vertical when the lid is in the closed state lies in the range 0° to 30°, with, a priori, a bottom rod 112 that is longer than the top rod 111, whereas in the first example (FIGS. 1 to 3), the corresponding angle "$i_2$" advantageously lies in the range 5° to 45° under the same conditions.

Thus, preference is given to opening the lid by tilting it forwards.

Naturally, the present invention is not limited to the embodiments described above with reference to the accompanying figures. For example, it is possible to use any other hydraulic or electric means as the actuator 22, such as, for example, axial motors forming the bottom axis 17. It is thus possible for the hooks of the latches to be carried by the lid, the bar being carried by the bodywork. It is also possible to use more than two rods per articulated arm 9. However, that solution is less compact and more difficult to control.

It is also possible to imagine offsetting the lid locking zone and the lid hinge zone slightly relative to each other, either at the front or at the rear, as, for example, in the front of trunk in U.S. Pat. No. 5,655,331 (column 2, line 39—column 3, line 15), or in FR 02 01232 of Feb. 1, 2002. In any event, both in U.S. Pat. No. 5,655,331 and in the embodiment shown diagrammatically in FIG. 6, the articulated arm 9 (or the actuators) are fixed remotely from the hinge and locking means, i.e. they are not fixed to said hinge and locking means, unlike the end "partial arms" of U.S. Pat. No. 6,186,577 which extend, on either side of the trunk between the front pivot means and the locking elements in engagement on the bodywork, and which are thus coupled directly thereto. Dissociating the means (actuators, articulated arms) for assisting lid opening/lid closure from the locking members and from the hinge members can make it possible to improve the overall design of the mechanisms related to moving the lid.

The invention claimed is:

1. A lid assembly provided on a rear trunk of a convertible vehicle having a front, a rear and a longitudinal axis, and comprising a bodywork and a movable roof adapted to cover a passenger compartment of the vehicle in a first position and to uncover said passenger compartment in a second position, the lid assembly comprising:
   a lid which has a front edge and a rear edge, which is hinged relative to the bodywork of the vehicle and which is locked relative to said bodywork in a releasable manner, both in the vicinity of the front edge and the rear edge, by front and rear locking and hinge members, respectively, so as to be movable between a closed position and a first open position by pivoting from said front backwards about a rear axis, for allowing the roof to pass from said first position to said second position, and between said closed position and a second open position by pivoting from the rear forwards about a front axis, for a rear access to the rear trunk, and
   control means adapted to open the lid from both said front backwards and rear forwards, and to close the lid, the control means comprising at least one articulated arm which is movable and operated between a retracted position in which the lid is in its closed position and a first deployed position in which the lid is in its first open position, for having said lid pivoted about said rear axis, wherein said at least one articulated arm is further movable and operated between said retracted position and a second deployed position in which the lid is in its second open position further to a pivoting of said lid about said front axis, so that said deployment of said at least one articulated arm from the retracted position to said second deployed position operates the pivoting of the lid from the rear forwards, about said front axis,
   wherein the front locking and hinge members are dissociated from said at least one articulated arm, and
   wherein, through said front locking and hinge members, the lid is directly articulated on the bodywork of the vehicle.

2. The lid assembly of claim 1, further comprising: an actuator which is connected to said at least one articulated arm and to the bodywork, and which is adapted to actuate the articulated arm.

3. The lid assembly of claim 1, wherein said at least one articulated arm is articulated on the lid about a first axis which is spaced apart from the front axis.

4. The lid assembly according to claim 3, wherein said first axis is further spaced apart from the rear axis.

5. The lid assembly according to claim 1, wherein said at least one articulated arm comprises:
   a top rod connected, in the vicinity of a top end, to the lid, in a manner such as to pivot about a top axis transverse to the longitudinal axis of the vehicle, and
   a bottom rod connected, in the vicinity of a bottom end, to the bodywork, in a manner such as to pivot about a bottom axis transverse to said longitudinal axis of the vehicle, and, in the vicinity of a top end, to said bottom end of the top rod in a manner such as to pivot about an intermediate hinge axis transverse to said longitudinal axis, said intermediate hinge axis being situated further forward than a straight line that interconnects said bottom and top hinge axes, when the lid is open backwards, the top axis being longitudinally situated between the front edge and the rear edge of the lid.

6. The lid assembly according to claim 1, wherein:
   said at least one articulated arm comprises:
   a top rod connected, in the vicinity of a top end, to the lid, in a manner such as to pivot about a top axis transverse to the longitudinal axis of the vehicle, and
   a bottom rod connected, in the vicinity of a bottom end, to the bodywork, in a manner such as to pivot about a bottom axis transverse to said longitudinal axis of the vehicle, and, in the vicinity of a top end, to said bottom end of the top rod in a manner such as to pivot about an intermediate hinge axis transverse to said longitudinal axis, and,
   said at least one articulated arm defines, at said intermediate hinge axis, an angle pointing forwards when the lid is in its closed position and when said lid is in either of its open backwards and forwards positions.

7. The lid assembly according to claim 1, wherein:
   said at least one articulated arm comprises:
   a top rod connected, in the vicinity of a top end, to the lid, in a manner such as to pivot about a top axis transverse to the longitudinal axis of the vehicle, and a bottom rod connected, in the vicinity of a bottom end, to the bodywork, in a manner such as to pivot about a bottom axis transverse to said longitudinal axis of the vehicle, and, in the vicinity of its top end, to said bottom end of the top rod in a manner such as to pivot about an intermediate hinge axis transverse to said longitudinal axis, and, said intermediate axis is situated further backwards than a straight line that interconnects the bottom and the top axes, when the lid is open forwards, and the top axis is situated between the front edge and the rear edge of the lid.

8. The lid assembly according to claim 1, wherein:
said at least one articulated arm comprises:
a top rod connected, in the vicinity of a top end, to the lid, in a manner such as to pivot about a top axis transverse to the longitudinal axis the vehicle, and
a bottom rod connected, in the vicinity of a bottom end, to the bodywork, in a manner such as to pivot about a bottom axis transverse to said longitudinal axis of the vehicle, and, in the vicinity of a top end, to said bottom end of the top rod in a manner such as to pivot about an intermediate hinge axis transverse to said longitudinal axis,
the rear trunk is laterally delimited by side walls of the bodywork, each having upwardly a top edge,
when the lid is open as backwards as forwards, an opening plane of the rear trunk is defined by said top edges of the side walls,
said at least one articulated arm is arranged so that, when the lid is open as backwards as forwards, the top end of the bottom rod is situated above said opening plane of the rear trunk, and
wherein said at least one articulated arm is arranged such that, when the lid is open as backwards as forwards, a projection of the top rod in the opening plane extends beyond a perimeter defined by said top edges of the side walls.

9. The lid assembly according to claim 1, wherein:
said at least one articulated arm comprises:
a top rod connected, in the vicinity of a top end, to the lid, in a manner such as to pivot about a top axis transverse to the longitudinal axis of the vehicle, and
a bottom rod connected, in the vicinity of a bottom end, to the bodywork, in a manner such as to pivot about a bottom axis transverse to said longitudinal axis of the vehicle, and, in the vicinity of a top end, to said bottom end of the top rod in a manner such as to pivot about an intermediate hinge axis transverse to said longitudinal axis, and,
a bottom end of the bottom rod is hinged to a portion of the bodywork that defines a floor for the rear trunk.

10. The lid assembly according to claim 1, wherein the control means are disposed entirely inside the rear trunk when the lid is in the closed position.

11. The lid assembly according to claim 1, wherein:
the lid is releasably locked relative to the bodywork through front reversible locking means and through rear reversible locking means,
said at least one articulated arm is articulated to the lid, remotely from said respective front and rear axes,
each of the respective front and rear reversible locking members comprises a first coupling member attached to the lid and a second coupling member attached to the bodywork,
one of said first and second coupling members is mounted to move between:

an unlocking position in which, when the lid is in the closed position and has to be opened, it is disposed relative to the other of said coupling members in a manner such that said other coupling member is released from it during opening of the lid,
and a locking position in which, when the lid is in the closed position and has to be left in said closed position, it retains said other coupling member.

12. The lid assembly according to claim 2, wherein the actuator has a predetermined stroke, said at least one articulated arm and said actuator being secured in a hinged manner respectively to the bodywork and to each other at locations arranged so that the stroke of the actuator is substantially identical regardless of the opening direction of the lid, from the rear forwards or from the front backwards.

13. A lid assembly provided on a rear trunk of a convertible vehicle having a front, a rear and a longitudinal axis, and comprising a bodywork and a movable roof adapted to cover a passenger compartment of the vehicle in a first position and to uncover said passenger compartment in a second position, the lid assembly comprising:
a lid which has a front edge and a rear edge, which is connected to the bodywork of the vehicle by front and rear locking and hinge members respectively, both in the vicinity of its front edge and its rear edge, said front and rear locking and hinge members being so arranged as to either lock the lid relative to the bodywork, in a hinged manner, or unlock the lid, so that said lid is movable between a closed position and a first open position by pivoting from said front backwards about a rear axis, for allowing the roof to pass from said first position to said second position, and between said closed position and a second open position by pivoting from the rear forwards about a front axis, for a rear access to the rear trunk,
control means adapted to open the lid from both said front backwards and rear forwards, and to close the lid, the control means comprising at least one articulated arm and an actuator for causing movement of said at least one articulated arm, said at least one articulated arm being arranged as to be movable and operated between a retracted position in which the lid is in its closed position and a first deployed position in which the lid is in its first open position, further to an unlocking of the front locking and hinge members and a pivoting of said lid about said rear axis,
said at least one articulated arm having two ends and said actuator being directly connected to said at least one articulated arm at a point between said two ends,
the front locking and hinge members being dissociated from said at least one articulated arm,
said at least one articulated arm being articulated on the lid about an axis which is spaced apart from the front axis, and
said at least one articulated arm being further movable and operated between said retracted position and a second deployed position in which the lid is in its second open position further to a pivoting of said lid about said front axis, so that the deployment of said at least one articulated arm from the retracted position to said second deployed position operates the pivoting of the lid from the rear forwards, about said front axis.

* * * * *